US011817999B1

United States Patent
Rathore et al.

(10) Patent No.: US 11,817,999 B1
(45) Date of Patent: *Nov. 14, 2023

(54) COMPUTER-BASED SYSTEMS FOR MANAGEMENT OF BIG DATA DEVELOPMENT PLATFORMS BASED ON MACHINE LEARNING TECHNIQUES AND METHODS OF USE THEREOF

(71) Applicant: American Express Travel Related Services Company, Inc., New York, NY (US)

(72) Inventors: Pratap Singh Rathore, Phoenix, AZ (US); Arindam Chatterjee, Phoenix, AZ (US); Nitish Sharma, Phoenix, AZ (US); Brian Rosenfield, Phoenix, AZ (US); Shourya Roy, Bangalore (IN); Rahul Ghosh, Bangalore (IN); Krishnaprasad Narayanan, Bangalore (IN)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,568

(22) Filed: Nov. 17, 2021

Related U.S. Application Data

(63) Continuation of application No. 17/124,447, filed on Dec. 16, 2020, now Pat. No. 11,206,179.

(51) Int. Cl.
*H04L 41/0806* (2022.01)
*G06N 20/00* (2019.01)
(Continued)

(52) U.S. Cl.
CPC .......... *H04L 41/0806* (2013.01); *G06N 5/04* (2013.01); *G06N 20/00* (2019.01); *H04L 63/08* (2013.01);
(Continued)

(58) Field of Classification Search
CPC ..... H04L 41/0806; H04L 63/08; H04L 41/22; H04L 67/10; G06N 5/04; G06N 20/00; G06Q 10/103
See application file for complete search history.

(56) References Cited

U.S. PATENT DOCUMENTS 9,888,337 B1  2/2018  Zalewski et al.
2004/0128546 A1  7/2004  Blakley et al.
(Continued)

*Primary Examiner* — El Hadji M Sall
(74) *Attorney, Agent, or Firm* — Thomas| Horstemeyer, LLP

(57) ABSTRACT

At least some embodiments are directed to a system that receives from an online portal loaded in a computing device, a user request to instantiate a server cluster in a hybrid computer network. The system authenticates and redirects the user request to a selected computer network configured in the hybrid computer network. The system instantiates the server cluster in the selected computer network causing the server cluster to initiate a microservice agent during bootup. The system sends a command to the server cluster to initiate the execution of a process and receives from the microservice agent event data associated with the process. The system inputs the event data into a trained machine learning model to determine a first execution state of the process and sends a command to change the first execution state of the process to a second execution state.

20 Claims, 10 Drawing Sheets

(51) Int. Cl.
  *G06N 5/04* (2023.01)
  *H04L 9/40* (2022.01)
  *H04L 67/10* (2022.01)
  *G06Q 10/10* (2023.01)
  *H04L 41/22* (2022.01)

(52) U.S. Cl.
  CPC ............ *G06Q 10/103* (2013.01); *H04L 41/22* (2013.01); *H04L 67/10* (2013.01)

(56) References Cited

U.S. PATENT DOCUMENTS

| | | | |
|---|---|---|---|
| 2007/0088840 A1* | 4/2007 | Kerf | .................. H04L 69/24 |
| | | | 709/230 |
| 2013/0297729 A1 | 11/2013 | Suni et al. | |
| 2016/0253641 A1 | 9/2016 | Smith et al. | |
| 2016/0269228 A1 | 9/2016 | Franke et al. | |
| 2018/0069925 A1 | 3/2018 | Lavasani | |
| 2020/0257522 A1 | 8/2020 | Cheng et al. | |
| 2020/0272490 A1 | 8/2020 | Brown et al. | |
| 2021/0224306 A1* | 7/2021 | Choudhary | ............ G06N 20/00 |
| 2021/0281662 A1* | 9/2021 | Mathur | ............... G06F 9/45558 |

* cited by examiner

COMPUTER-BASED SYSTEMS FOR MANAGEMENT OF BIG DATA DEVELOPMENT PLATFORMS BASED ON MACHINE LEARNING TECHNIQUES AND METHODS OF USE THEREOF

CROSS-REFERENCE TO RELATED APPLICATIONS

This application claims priority to, and the benefit of, copending U.S. patent application Ser. No. 17/124,447, entitled "COMPUTER-BASED SYSTEMS FOR MANAGEMENT OF BIG DATA DEVELOPMENT PLATFORMS BASED ON MACHINE LEARNING TECHNIQUES AND METHODS OF USE THEREOF" and filed on Dec. 16, 2020, which is incorporated by reference as if set forth herein in its entirety.

BACKGROUND

Scalability problems of big data applications typically occur when big data applications require more computing capacity than the capacity available in on-premise computer networks. Software and data migration from on-premise computer networks to off-premise computer networks and the integration of software collaboration tools between these networks can be a complex a long lasting process.

SUMMARY OF DESCRIBED SUBJECT MATTER

In some embodiments, the present disclosure provides a system that receives, from an online portal loaded in a computing device, a user request to instantiate a server cluster in a hybrid computer network. The system authenticates a user associated with the user request utilizing an identity management registry and redirects the user request via a proxy service to a selected computer network configured in the hybrid computer network. The system instantiates the server cluster in the selected computer network. The server cluster is configured to initiate a microservice agent during the bootup of the server cluster and sends a command to the server cluster to initiate the execution of a big data process in the server cluster. The system receives from the at least one microservice agent, event data associated with the big data process and inputs the event data into a trained machine learning model to determine a first execution state of the big data process. The system sends a command, via the proxy service, to change the first execution state of the big data process to a second execution state of the big data process and receive an update message form the microservice agent indicative of whether the big data process was successfully changed to the second execution state.

In some embodiments, the first execution state indicates that the big data process is in a hung state. Thereafter, the system sends a command to the server cluster to backup data associated with the big data process and terminates the big data process.

In some embodiments, the first execution state indicates that the big data process has been running for a first predetermined time threshold. Thereafter, the system sends a message to a user computing device associated with the user indicating that the big data process has been running for the first predetermined time threshold, sends a command to the server cluster to backup data associated with the big data process and terminates the big data process based on a confirmation message received from the computing device or when no confirmation message is received from the computing device before a second predetermined time threshold.

In some embodiments, the event data can include process running duration, central processing unit utility rate, memory utility rate, disk utility rate, a parent process identifier a number of child processes associated with the process, the process name, or the process creation time.

In some embodiments, the selected computer network is an on-premise computer network, the server cluster is an on-premise server cluster, and the on-premise server cluster is in communication with an off-premise server cluster via a software collaboration tool.

In some embodiments, the selected computer network is an off-premise computer network, the server cluster is an off-premise server cluster, and the off-premise server cluster is in communication with an on-premise server cluster via a software collaboration tool.

In some embodiments, the system redirects the user to an online integrated development environment operatively coupled to the server cluster upon the instantiation of the server cluster.

BRIEF DESCRIPTION OF THE DRAWINGS

Various embodiments of the present disclosure can be further explained with reference to the attached drawings, wherein like structures are referred to by like numerals throughout the several drawings. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

DETAILED DESCRIPTION

Figure 1:
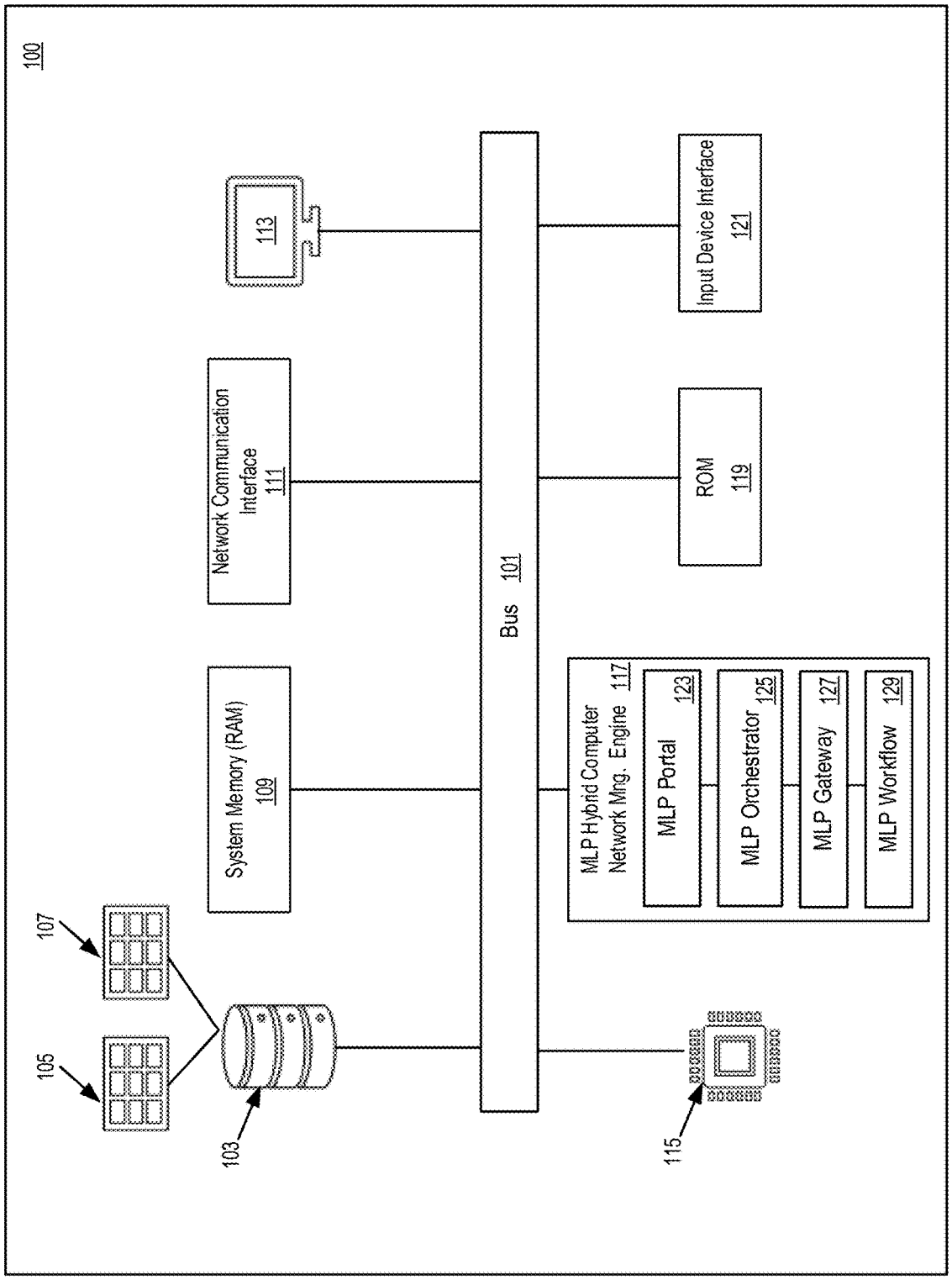
FIGS. 1-9 show one or more schematic flow diagrams, certain computer-based architectures, and/or implementations which are illustrative of some examples of aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given about the various embodiments of the present disclosure is intended to be illustrative, and not restrictive.

FIGS. 1 through 9 illustrate computer-based systems and methods for management of big data development platforms based on machine learning techniques.

As used herein the term "on-premise computer network" can refer to a computer network executing software that is installed on the premises of an enterprise.

As used herein the term "off-premise computer network" can refer to computer infrastructure and software provided by a cloud service provider. Off-premise computer networks can provide software as a service, platform as a service, and other suitable services.

As used herein the term "hybrid computer network" can refer to a computer network that uses computational services and resources that are situated in on-premise computer network and off-premise computer networks.

As used herein the term "software collaboration tool" can refer to an application that allows users to create and share documents that contain live code, equations, visualizations and narrative text. Software collaboration tools can be used for data cleaning, data transformation, numerical simulation, statistical modeling, data visualization, and/or machine learning modeling. Examples of software collaboration tools can include, for example, Jupyter Notebook®, Google Colab® and other suitable software collaboration tools.

As used herein the term "computing environment" can refer a collection of computer infrastructure, server clusters, data storage devices, work stations, software applications, and networks that support the processing and exchange of electronic information.

As used herein the term "scale up" can refer to adding computing resources to an existing system to reach a desired state of performance for example adding computing resource to an existing system by migrating the system from on-premise computer networks to off-premise computer networks.

As used herein the term "scale down" can refer to reducing computing resources to an existing system, for example, by migrating the system from an off-premise computer network to an on-premise computer network.

As used herein the term "cloud service provider" can refer an organization that provide services including use of off-premise computer networks, software as a service, platform as a service, infrastructure as a service, for example, Amazon Web Services®, Microsoft Azure®, Google Cloud Platform®, IBM Cloud Services®, and other suitable cloud service providers.

As used herein the term "online integrated development environment" can refer to a browser based integrated development environment. An online IDE can be accessed from a web browser, such as Google Chrome or Internet Explorer, enabling software development on low-powered devices that are normally unsuitable to deal with the development and execution of big data software applications.

As used herein the term "big data" can refer to high-volume, high-velocity, and high-variety information assets. High volume refers to the magnitude of data, for example, big data sizes can amount to multiple terabytes and petabytes. High-velocity refers to the rate at which big data is generated and the speed at which it can be analyzed and acted upon. High-variety refers to the heterogeneity in datasets which may include structured, semi-structured and unstructured data.

As use herein the term "big data process" can refer to a computer process executed by a server, a server cluster, or other suitable computing device. A "big data process" process high-volume, high-velocity, and high variety of information assets. Some examples of big data processes can include machine learning processes, data mining processes, processes operating with real-time data, and other suitable processes that handle big data.

In some embodiments, hybrid cloud network technical solutions disclosed herein can enable enterprises to make use of both on-premises computer networks and off-premise computer networks. One advantage of the embodiments presented herein is the flexibility they offer to users by allowing big-data workloads to alternate between on-premise computer networks and off-premise computer networks depending on needed computing capacity during the development, implementations, and deployment of big data software applications.

In some embodiments, a system provides capabilities for data scientists, engineers, software application developers, or other suitable users ("users") to use services available in on-premise computer networks such as collaboration software tools via a browser running in an Intranet while securely managing the identity of the users and data across a hybrid cloud computer network.

In some embodiments, the system tracks and manages the life-cycle of software applications and other computing services running in a hybrid computer network providing, for example, automatic termination of software applications and computing services employing machine learning techniques. Thus, the system can proactively prevent over-use or waste of computing resources available in hybrid computing networks.

FIG. 1 illustrates an example of an implementation of a system for management of big data development platforms based on machine learning techniques, in accordance with one or more embodiments of the present disclosure. In some embodiments, the system for management of big data development platforms 100 can include a communication bus 101, a processor 115, a Machine Learning Platform (MLP) hybrid computer network management engine 117, a system memory (RAM) 109, a read-only memory (ROM) 119, a big data database 103, an input device interface 121, an output device interface such as display 113, and a network communication interface 111.

In some embodiments, the communication bus 101 collectively represents system peripheral, and/or chipset buses that communicatively connect the numerous internal devices of the system 100. The communication bus 101 may be a physical interface for interconnecting the various components. In some embodiments, the communication bus 101 may be a computer network interface, router, switch, or other communication interface.

In some embodiments, the system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory, such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, among other data related to the operation of system 100.

In some embodiments, the big data database 103 can store data sets 105 and 107. In some embodiments, the system 100 may receive, store, or have access to large data sets stored in the database 103. Data sets 105 and 107 can include, for example, data sets that may be analyzed or mined computationally to reveal patterns, trends, and associations.

In some embodiments, the engine 117 can track one or more activities of software applications, software services, software collaboration tools, and other suitable software running in a hybrid computer network.

In some embodiments, the engine 117 can include other engines such as a MLP Portal 123, MLP Orchestrator 125, MLP Gateway 127, and MLP Workflow 129. Examples of operations executed by the engine 117 are further described below with reference to FIG. 2 to FIG. 9.

In some embodiments, a user may interact with the system 100 via a display 113 and a user input device interface 121. The input device interface 121 may include, e.g., a mouse, a keyboard, a touch panel of the display 113, motion tracking and/or detecting system, or an imaging device, among other input devices. In some implementations, graphical user interfaces (GUI), results, and statuses related to the system 100 and operations thereof may be displayed to the user via the display 113.

As shown in FIG. 1, the communication bus 101 can also couple the system 100 to a hybrid computer network through a network communication interface 111. In this manner, the system 100 can be part of a network of computers, for example a hybrid computer network, a local area network ("LAN"), a wide area network ("WAN"), an Intranet network, or a network of networks, for example, the Internet. Thus, the system 100 can receive inputs from other computing devices, transmit outputs to other computing devices, migrate big-data in a hybrid computer network, deploy big data software applications and software collaboration tools, and transmit outputs or results to other computing devices via the network communication interface 111.

Figure 2:
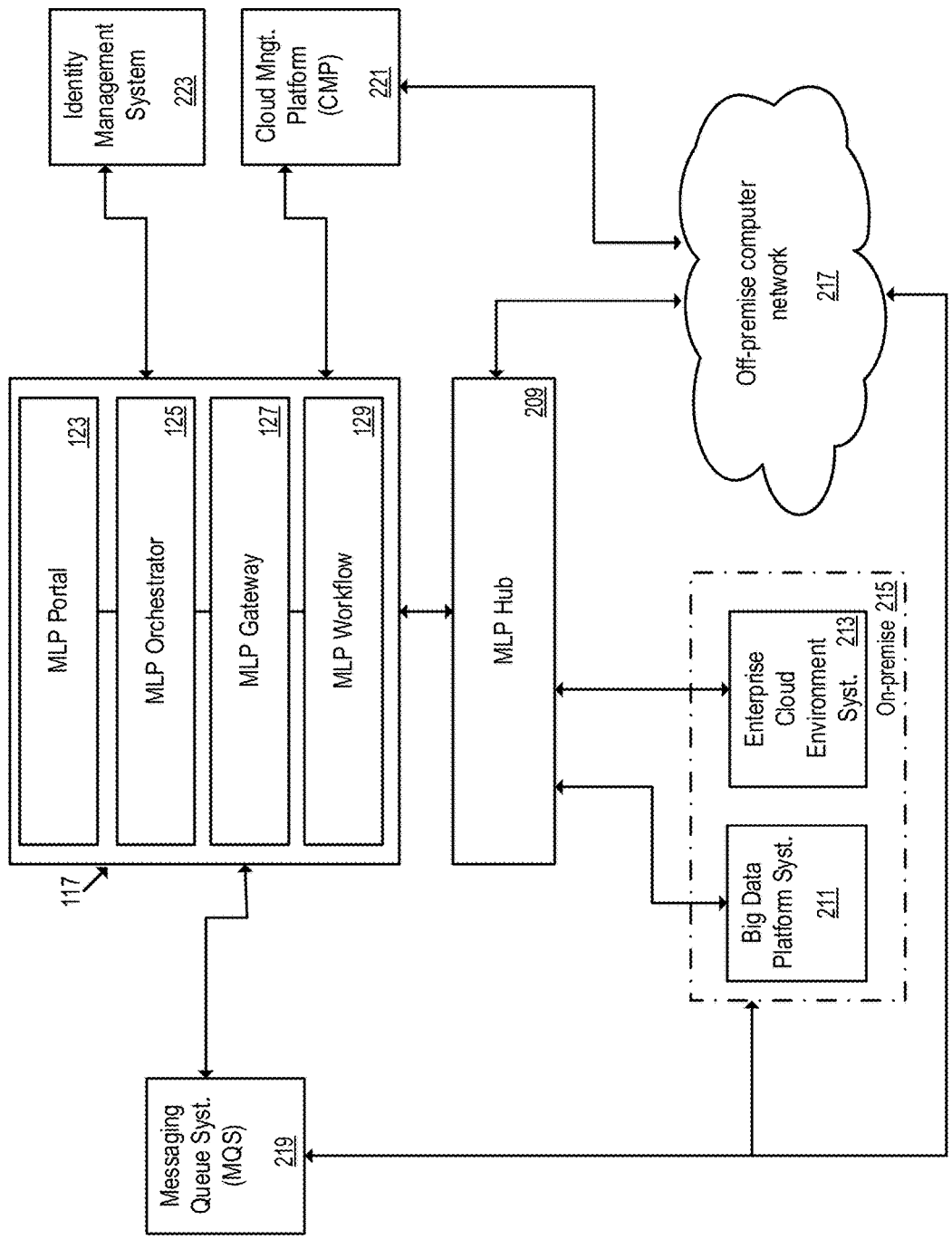

FIG. 2 illustrates an example of a configuration of the system for management of big data development platforms based on machine learning techniques, in accordance with one or more embodiments of the present disclosure. In some implementations, the MLP Portal 123 can be a web interface hosted in on-premise computer network 215, off-premise computer network 217, the Internet, or other suitable computer network. Users can access the MLP Portal 123, for example, using a web browser, a text-based interface, or other suitable user interface. The MLP Portal 123 can include a GUI that enables users to configure big data development environments, migrate big data from on-premise computer networks e.g., 215 to off-premise computer networks e.g., 217, and migrate big data from off-premise computer networks 217 to on-premise computer networks 215. Users can also implement and test big data software application in the on-premise network 215 and deploy such big data software applications to the off-premise computer network 217 using the MLP Portal 123. Likewise, users can migrate software collaboration tools from on-premise computer 215 networks to off-premise computer networks 217 and the other way around. Users can migrate software collaboration tools from on-premise computer network 215 to off-premise computer network 217 (or the other way around) without altering, tampering, or modifying the content or environment of software collaboration tools thus, retaining user experience after migration. An example of a GUI that can be implemented by the MLP Portal 123 is discussed below with reference to FIG. 3.

In some embodiments, the MLP Orchestrator 125 can enable users to implement, develop, test, and execute machine learning model processes, big data processes, or other suitable computer processes that use big data in on-premise computer networks 215, off-premise computer networks 217, and combinations thereof. The MLP Orchestrator 125 enables users to execute several big data processes including scale up or scale down of computing environments. For example, the Orchestrator 125 can enable the provisioning of computer resources to be used in a computing environment. Likewise, the Orchestrator 125 can identify optimal development computing environments and implementation computing environments based on the type of project or application in development or intended to be develop.

In some embodiments the MLP Orchestrator 125 can monitor computing resources that are overutilized or underutilized in computing environments implemented in on-premise computer network 215, off-premise computer network 217, an any combination thereof. Likewise, the MLP Orchestrator 125 enables users to launch or implement new computing environments in on-premise computer network 215, off-premise computer networks 217, or any combination thereof.

In some embodiments, the MLP Gateway 127 can transmit and receive data from microservice agent applications ("microservice agents") implemented in, for example, big data platform system 211, enterprise cloud environment system 213, and server clusters (not shown in FIG. 2) in off-premise computer network 217. Accordingly, the MLP Gateway 127 can process information received microservice agents from any computer or servers implemented in on-premise network 215 and off-premise computer network 215. The microservice agents can send information to the MLP Gateway 127 associated with user activity and process activities running in server clusters. The MLP Gateway 127 can store such information in the operational metadata database or repository discuss below with reference to FIG. 4.

In some embodiments, the MLP Workflow 129 can implement listener applications to receive events from server clusters configured in a hybrid computer network, the MLP Orchestrator 125, the MLP Gateway, and/or the MLP Portal 123. The MLP Workflow 129 is further discuss below with reference to FIG. 4. A hybrid computer network can include computer devices located in on-premise computer network 215 and public network 217.

In some embodiments, the MLP Hub 209 can provide users with a single access point to computing environments and resources implemented in a hybrid computer network without burdening the users with login requests, installation, and maintenance tasks. The MLP Hub 209 can provide users with software development workspaces on shared computer resources in a hybrid computer network, for example, shared computer resources can include one or more computer resources from big data platform system 211, enterprise cloud environment system 213, and other computer resources residing in the off-premise computer network 217.

In some embodiments, the MLP Hub 209 can run on a remote server or can be comprised in the system 100. The MLP Hub 209 can provide users with share working spaces and software collaboration tools where users can develop and run applications. Users can also share results with other users without having to set up virtual environments and without dependency conflicts may occur when multiple applications rely on different, incompatible versions of the same dependency application.

In some embodiments the MLP Hub 209 can provide proxy services and can be implemented as a separate configurable proxy server or can be comprised in the system 100. Accordingly, when a user sends commands or request access via the MLP Portal 123 to computer resources or software applications implemented in the hybrid computer network, the request or command can be handled first by the MLP Hub 209 thereafter, the MLP Hub 209 can redirect the request or command to the proper computer resources or software applications located in a hybrid computer network.

In some embodiments, users can login into the MLP Portal 123 and the MLP Hub 209 can redirect the user to a specific computing environment associated with that user. The use of the MLP Hub 209 results in several benefits for the users, for example, users do not need to know what is the Internet Protocol address or uniform resource locator (URL) of a server they are being redirected. In addition, users can enter commands via the MLP Portal 123, and thereafter the MLP Hub 209 can redirect such commands to a computing environment implemented in the hybrid computer network without prompting the user to login into computer resources included in the computing environment.

In some embodiments, the big data platform system 211 can be implemented with a cluster of servers that centralize data across an enterprise or company. The enterprise cloud environment system 213 can enable users to deploy and run big data software applications in an enterprise cloud environment. The enterprise cloud environment system 213 can be implemented with a cluster of servers that stores and manages big data and big data software applications.

In some embodiments, the identity management registry system 223 can be used to ensure that the proper users in an enterprise have the appropriate access to available computer resources in the hybrid computer network. In some instances, when a user login into the MLP Portal 123, the identity management registry system 223 can authenticate the user and generate a session token that can be used to access computing environments implemented in the hybrid computer network according to user-specific permissions, for example, the token can be used to access an online integrated development environment instantiated in a server cluster or operatively coupled to the server cluster.

In some embodiments, the cloud management platform 221 can be used by the MLP Orchestrator 125 to interact or manage the off-premise computer network 217. The cloud management platform 221 can implement a set of application programming interfaces (APIs) to request computer resources to the off-site computer network 221, for example, a request to reserve server clusters residing in the off-premise computer network 217.

In some embodiments the messaging queue system (MQS) 219 can be in communication, for example, with MLP Workflow 129 and computer or servers in the on-premise computer network 215 and the off-premise computer network 217. In some instances, the messaging queue system 219 can retrieve information from computers or servers in the on-premise computer network 215 and the off-premise computer network 217. Such information can include, for example, event information indicating when a cluster of servers has been instantiated and when is ready to be utilized by a user, including a date or timestamp indicating the time of the instantiation. The messaging queue system 219 can send such information to the MLP Workflow 129.

Figure 3:
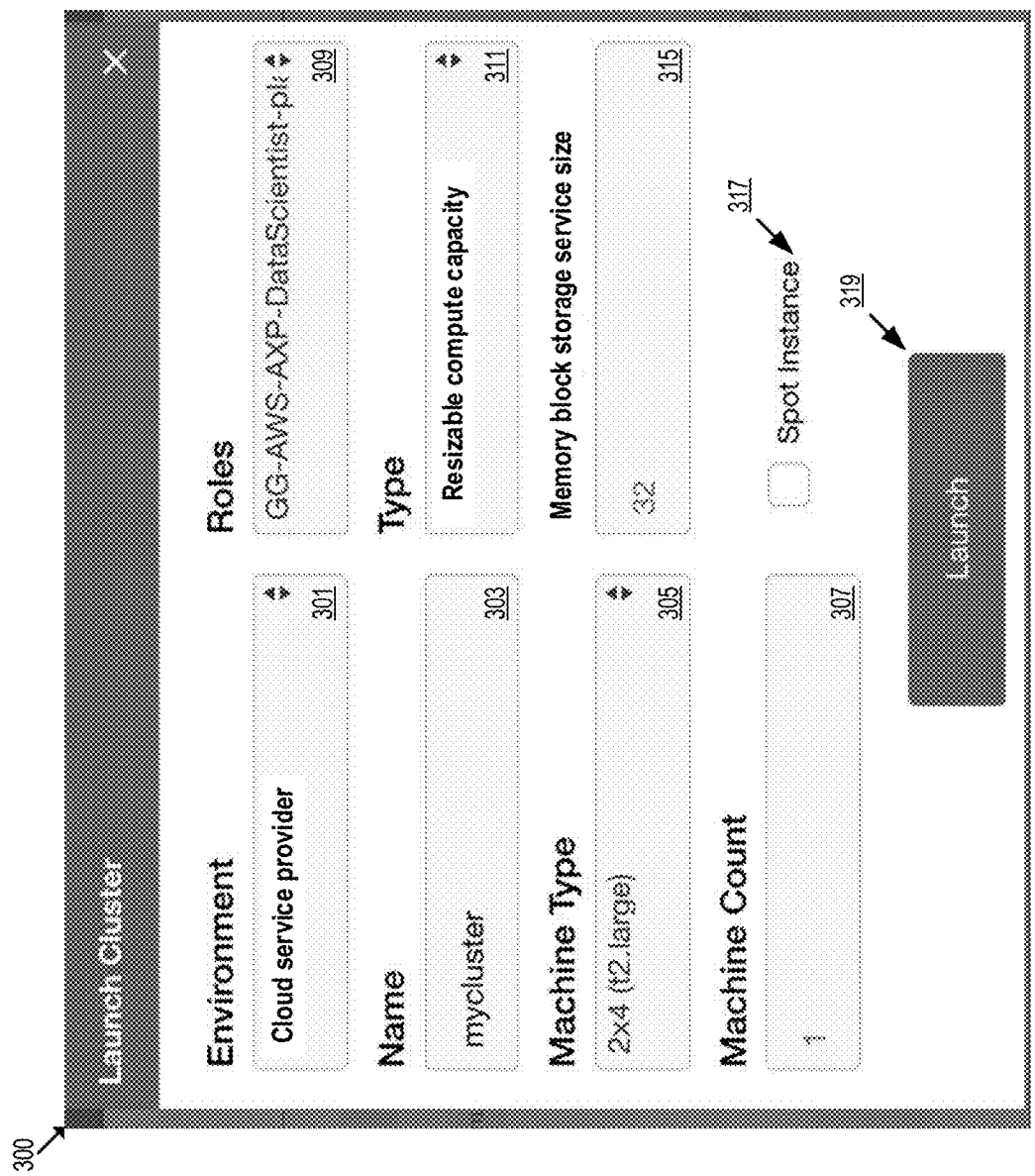

FIG. 3 illustrates an example of a graphical user interface implemented by the MLP Portal 123, in accordance with one or more embodiments of the present disclosure. The GUI 300 can be used to launch a computing environment in a hybrid computer network after a user has been authenticated via the cloud management platform 221. In the example shown in FIG. 3 a user can select an environment 301 for example, an off-premise cloud service provider, the big data platform system 211 (discussed with reference to FIG. 2), the enterprise cloud environment system 213 (also discussed with reference to FIG. 2), or another suitable network environment.

The GUI 300 also enables a user to select a name for a new server cluster or computing environment as shown at 303. A user can select a machine type as shown at 305. Machine types can include varying combinations of CPU, memory, storage, and networking capacity providing users with flexibility to choose the appropriate mix of resources for the development of their applications. A user can also select a number of machine instances by entering a number in the machine count 307. Users can also specify a user role by entering a role name at 309, different role names can be associated with different user privileges (e.g., access privileges, read privileges, write privileges or other suitable type of privileges) with respect to the new server cluster and/or new computing environment. In some instances, a user can enter at 311 a type of service provided by the cloud service provider. In this instance, the user has selected a resizable compute capacity which is a type of service provided by the cloud service provider selected at 301. A user can also specify a memory block storage service size at 315. Different memory block storage service sizes can be provided by the cloud service provider selected at 301. Memory block storage can be associated with a type of memory such as hard disk drive, solid state drive or other type of memory. The spot instance checkbox 317 enables user to view further details of a server cluster and computing environment. The launch button 319 enables users to launch the new server cluster and computing environment as discussed above, the MLP Portal 123 enables users to launch new server clusters or computing environments without the need to login into, for example, the cloud service provider system as the user can interact with the cloud service provider via the MLP Hub 209 (FIG. 2) and can be authenticated by the cloud management platform 221 (also in FIG. 2).

Figure 4:
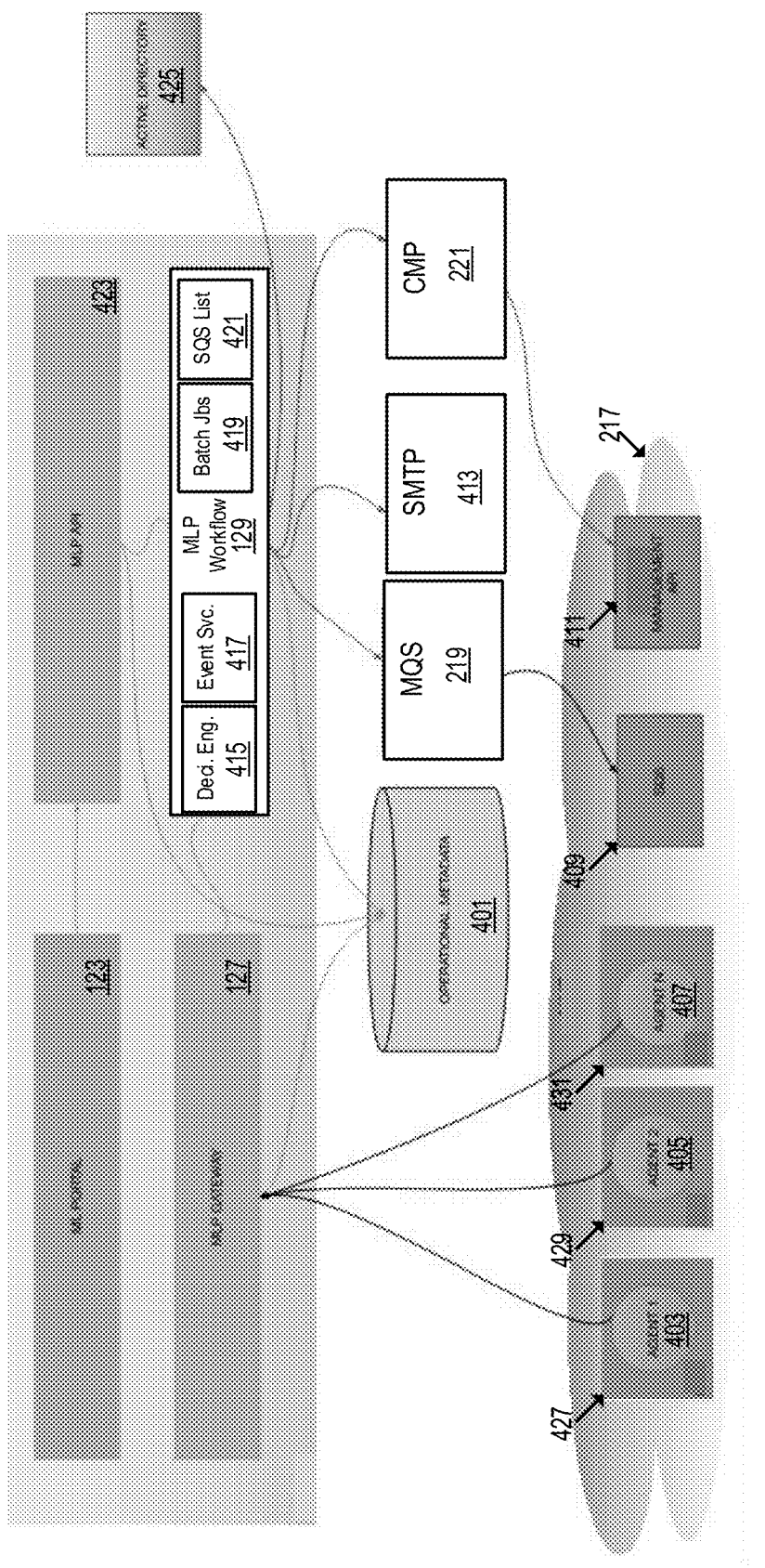

FIG. 4 illustrates an example of a launched computing environment configuration, in accordance with one or more embodiments of the present disclosure. In some instances, after a launch request is submitted via the MLP Portal 123 (as discussed above with reference to launch button 319 in FIG. 3), the MLP Orchestrator 125 can receive the request and launch server clusters instances 427, 429, and 431 in a computing environment with the specified computing configurations. The MLP Orchestrator 125 can be integrated with cloud service providers using a cloud management platform API such as MLP API 423. The MLP API 423 can initiate the process of creating the server cluster 427, 429, and 431.

In some embodiments, the system 100 can use event-based techniques to track the status of server clusters and computing environments. For instance, the MLP Workflow 129 can include event service 417 which is an event listener system configured to receive events occurring generated, for example, by processes utilizing computing resources and services provided by cloud service providers such events can be associated with user activities, processes activities or processes execution states. The MLP Workflow 129 can invoke an artificial intelligence or machine learning enabled decision engine 415 to set and update the workflow status associated with clusters 427, 429, and 431.

In some embodiments, the MQS 219 can retrieve events from Simple Queue Service (SQS) 409 occurring in off-premise computer network 217, the MLP Workflow listener 129 listens to the SQS 409 events via the MQS 219 and processes all the events via event service 417. The events retrieved by the MQS 219 can be stored in the SQS list 421. Users can access the off-premise computer network 217 via the MLP Portal 123 and the CMP 221 as discussed above with reference to FIG. 2. The CMP 221 can execute user authentications to the off-premise computer network 217 via the management API 411. The Simple Mail Transfer Protocol (SMTP) system 413 can be used by the MLP Workflow 129 to send emails to users informing them, for example, that a new server cluster has been instantiated, that a server cluster process has been terminated, that a server cluster process has been initiated, that a server cluster is running a process, that a server cluster process is hung or not running, and other suitable message related to server clusters and their processes. Batch jobs 419 can include set of programs processed in batch mode in on-premise computer network 215 and off-premise computer network 217. Accordingly, a sequence of commands can be executed by the operating system listed in a batch file and submitted for execution as a single unit to one or more servers or server clusters in the computer network 217.

In some embodiments, microservice agents 403, 405, and 407 can be embedded in the applications or processes running in the server clusters 427, 429, and 431 respectively. The microservice agents 403, 405, and 407 can initiate their execution at bootup of the servers included in the cluster servers 403, 405, and 407. The microservice agents 403, 405, and 407 can be implemented as microservice software applications. The microservice agents can register servers in server clusters 427, 429, and 431 with the event service 417. Accordingly, the MLP Workflow 129 can receive messages when an event is generated in the cluster servers 427, 429, and 431. The MLP Workflow 129 can receive events and accordingly updates status associated with the server clusters 427, 429, and 431 and process running therein.

In some embodiments, user activities and computer resources activities (also referred herein as events) can be tracked by the microservice agents 403, 405, and 407. The microservice agents can run on a configurable time frequency, for example, a frequency of 1 minute, 2 minutes, fractions of a minute or other suitable configurable time frequency and can send event information to the MLP Gateway 127 at such frequencies.

In some embodiments, the microservice agents 403, 405, and 407 can determine for how long a user has been running a process. In some instances, when a user is running a process for more than 24 hours or other amount of time or time value, the system 100 can send the process running time information to the MLP Gateway 127. The system 100 can send a notification (e.g., email or other suitable communication) to the user to verify whether the process should be running for that amount of time. Thereafter, the user can confirm that the process should be running for that amount or time or can send instructions to the system 100 to back up the process data and the process status and thereafter terminate the process. In some instances when the system 100 does not receive a confirmation or other instructions from the user after a predetermined time, then the system can back up the process data, the process status and terminate the process.

In some embodiments, the microservice agents 403, 405, and 407 can determine when a user has incurred in 20 minutes or other time value of inactivity. Thereafter, the microservice agents can mark processes associated with the inactive user for termination. In such a case, the system 100 can back up data and status of such processes and terminate the processes associated with the inactive user. The system 100 can notify the inactive user (e.g., via email or other suitable communication) that the processes have been terminated and that the processes data and status have been backed up.

In some embodiments, the microservice agents 403, 405, and 407 can determine what services or processes are running or ready to run on a server cluster. Accordingly, the microservice agents can send a message to the MLP Gateway 127 indicating when a server cluster is ready for execution and what user process are running or ready to run in the server cluster.

In some embodiments, when a server cluster is launched, the microservice agents 403, 405, and 407 can start during the bootup of the server cluster. The microservice agents can register the server cluster to generate different events and accordingly the microservice agents can send messages to the MLP Gateway 127 when such events occurred in the server cluster.

In some embodiments the MLP Gateway 127 can receive activity or event information occurring in server clusters 427, 429, and 431 and send such events to the MLP Workflow service 129. The MLP Gateway 127 and the MLP API 423 can store operational metadata in operation metadata database 401. Accordingly, operational metadata database 401 can store metadata related to the status of the server clusters, single servers, or processes running therein.

As discussed above, in some embodiments, the MLP Workflow module 129 can include a decision engine 415. The decision engine process can be enabled via a pipelined system. The decision engine 415 can determine whether any process is "instantiated" at the operating system level of the server clusters 427, 429, and 431. The decision engine 415 can identify the presence of a process, thereafter the decision engine 415 can determine whether the process is in "running" state or in "hung" state.

The technical problem of determining when a process is running or hung in a server cluster is non-deterministic because raw data that can be extracted from operating systems instantiated in server clusters does not indicate processes operating states. Accordingly, based on the non-deterministic nature of this technical problem a machine learning model can be implemented to determine the state of the processes running on the server clusters. Such a technical problem can be solved by utilizing a binary classification of the processes i.e., "running" or "hung." Accordingly, in some instances, two binary classes can be used e.g., "hung" or "running". Several features extracted from server clusters can be used to train a supervised machine learning model. These features can include process running duration, CPU, memory and disk consumption by the process, number of child processes, number of sibling processes, process name, process creation time and other suitable features. Some example of feature values are discussed below with reference to Table 1.

In some embodiments, categorical variables such as process name can be transformed into numerical variables using one-hot encoding techniques. In some instances, a gradient boosted decision tree classifier, e.g., Extreme Gradient Boosting Classifier (XGBoost), can be used to build the machine learning model however, it is noted that other suitable supervise machine learning models can be equally used. In some instances, a manual labelling process can be used to rectify mis-predictions made by the decision engine 415.

Some examples of artificial intelligence or machine learning models that can be implemented in decision engine 415 can include extreme gradient boosting classifier, random forest models, decision trees models, neural networks, logistic regression models, naïve Bayes models, AdaBoost models, and other suitable classification machine learning models.

Gradient boosting classifier models give a weight to each data sample and changes the weight after the training of a machine learning model classifier. The weight to the wrongly classified observation is increased and the weight to the correctly classified observation is reduced. The observations whose weights have been modified are used to train a subsequent classifier. A gradient boosting model is a sequential ensemble modeling technique that can be implemented in a step-by-step method by focusing on the gradient reduction of a loss function in previous models. The loss function may be interpreted as the degree of error by the model. In general, the greater the loss function, the more likely the model will have misclassified. As the purpose is to minimize the loss function and the error rate, a useful technique is to bring the loss function to decline in the gradient direction.

In some embodiments, the decision engine 415 can be implemented as a gradient boosting decision tree (GBDT). A GBDT is an iterative model process for decision trees. A regression tree and a gradient boosting model can be combined into decision trees, with a predefined trimming. Multiple decision trees can be built in the training process, with each tree gradient down by learning from the n−1 number of the tree. Finally, based on the aggregation of all the trees, weights can be can be determine whether a process is in "Running" or "Hung" state.

In some embodiments a classification machine learning model can be implemented as an extreme gradient boosting tree (XGBoost). An XGBoost model is an optimized version of a gradient boosting machine. The main improvement on GBDT is the normalization of the loss function to mitigate model variances. This also reduces the complexities of modeling and hence the likelihood of model over-fitness. The XGBoost model can support linear classifiers, applicable not only to classifications but also to linear regressions. The traditional GBDT approach only deals with the first derivative in learning, but XGBoost can improve the loss function with, for example, Taylor expansion. While the level of complexities increases for the learning of trees, normalization techniques can prevent inaccuracies in predictions associated with over-fitness. In a similar way to the implementation discussed above regarding GBDT, based on the aggregation of all the trees, weights can be produced to generate a final score indicative of whether a process is in "running state," "hung state" or other suitable state that can be predicted based on the training of the machine learning model classifier.

In some instances, based on the state of the process (e.g., hung or running), an appropriate action is taken by the system 100, for example continuation of a running process or termination of a hung process instantiated in the server clusters.

In some embodiments, when the decision engine 415 determines the state of a process, the MLP Workflow 129 can act based on the determined process state, if the decision is to terminate the server cluster, the system 100 can invoke a terminate API, prior to termination the microservice agent associated with such a server cluster can back up all the user and process data in an object data store or database 401. In some instances, once a server cluster is terminated, the cluster can be marked as terminated in the system 100. In some instances, when a decision is to continue running a process, no actions may be taken by the MLP Workflow 129.

Some examples of training sets that can be used to build the decision engine 415 are provided below in TABLE 1.

In some embodiments, the decision engine can predict whether a process is hung, running, or in other state on server cluster based on process running duration, percentage of utilized CPU, percentage of utilized memory, percentage of disk utility, whether there is a parent process for an inspected process, number of child process of an inspected process, process name, process creation time, and other suitable characteristics of a process running on a server or server cluster as shown in TABLE 1. It is noted that the embodiments described with reference to FIG. 4 are discussed in the context of the off-premise computer network 217 however it is understood that analogous embodiments are also applicable to the on-premise computer network 215 described above with reference to FIG. 2.

Figure 5A:
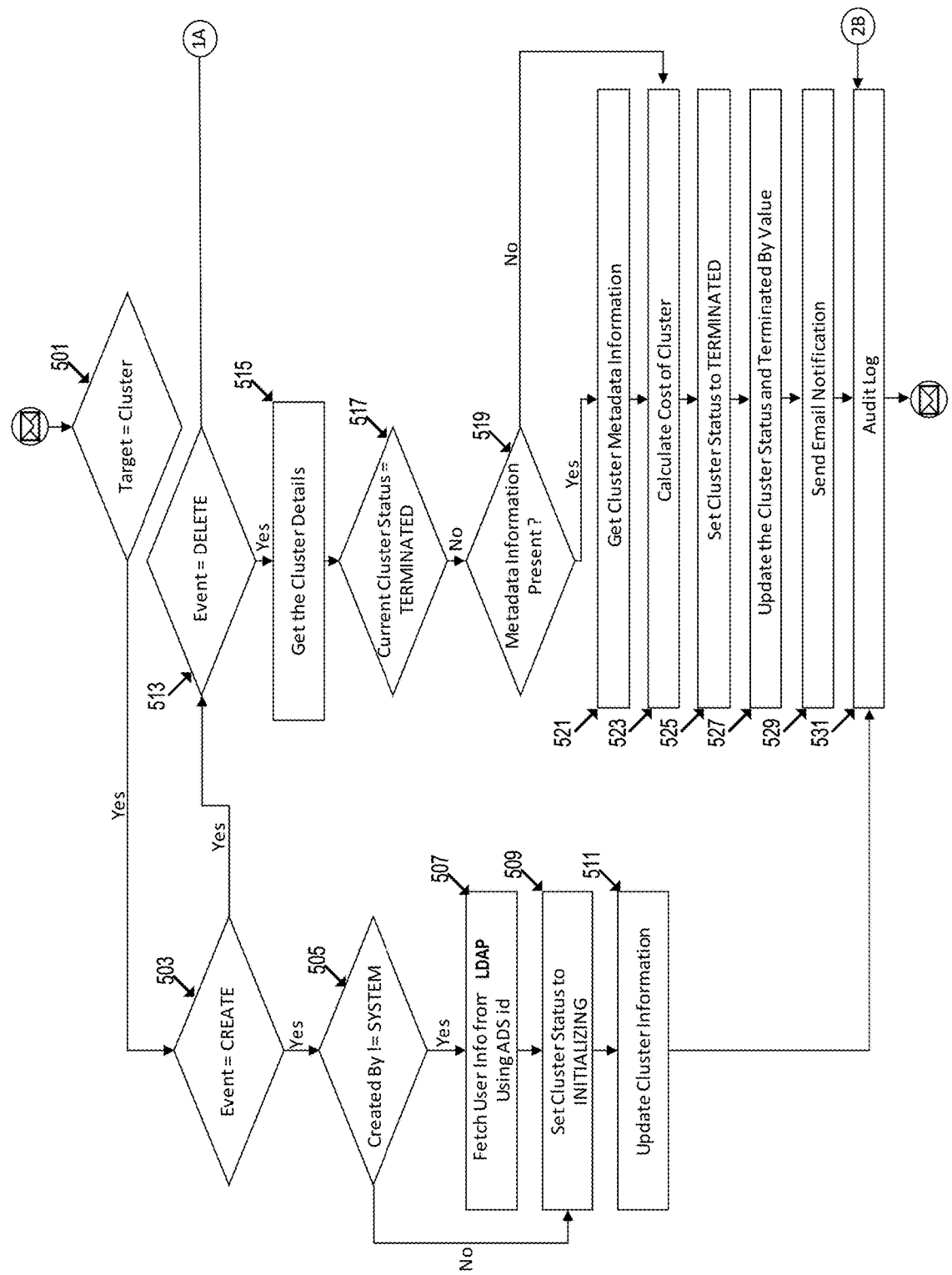
Figure 5B:
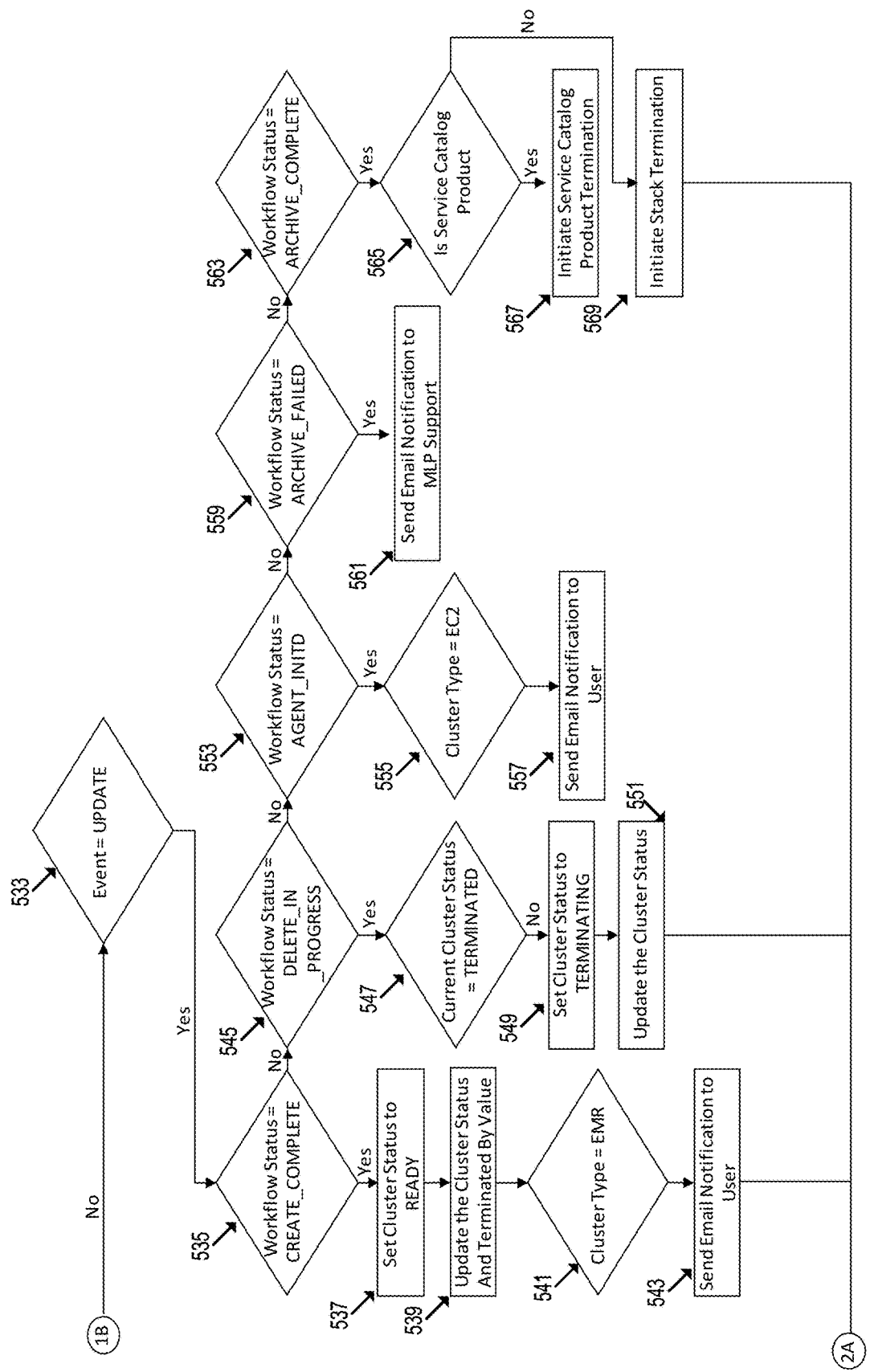

FIGS. 5A and 5B illustrate an example of a flowchart showing computations that can be executed by the system 100, in accordance with one or more embodiments of the present disclosure. At 501 the system 100 can receive a request associated with a target server cluster via, for example the MLP Portal 123 or other suitable application. The system 100 determines at 503 whether the request is to create a server cluster either in an on-premise computer network or an off-premise computer network. In some instances, at 505, when the server cluster has not been created, the system 100 fetches at 507 user information (e.g., user identification) from a Lightweight Directory Access Protocol (LDAP) using an Active Directory System (ADS system 425 shown in FIG. 4). The system 100 then sets at 509 the server cluster status to initializing. In some instances when the server cluster has been created by the system 100 as shown at 505, the flow continues at 509. Thereafter, the system 100 updates at 511 information associated with the server cluster and enters at 531 an entry to an AuditLog. The AuditLog can be a document that records event information associated with server clusters.

In some embodiments when the system 100 receives a request at 513 to delete a server cluster, the system 100 gets at 515 information about the server cluster. In some instances, at 517 the server cluster status may indicate that the server cluster has been already terminated the system 100 accordingly, no other action may be taken. In some other instances, at 517 the server cluster status may be different from terminated, in such a case the system 100 determines at 519 whether there is metadata associated with the server cluster or processes running in the server cluster. In some instances when there is metadata, the system 100 retrieves at 521 the server cluster metadata information and calculates at 523 the cost of the cluster, for example monetary charges made by a cloud service provider based on the type of services provided by the cloud service providers including the time a server cluster was used, type of servers included in the server cluster, type of memory and amount of memory resources utilized, computing resources e.g., processor utility rate, number of users configured to use the server cluster,

| Processor Running Duration | CPU Utility (%) | Mem. Utility (%) | Disk Utility (%) | Parent Process | Num. Child Process | Process Name | Process Creation Time | Label |
| --- | --- | --- | --- | --- | --- | --- | --- | --- |
| 20 min | 50% | 25% | 10% | NA | 2 | Proc. 3 | Jan. 18, 2020 | Running |
| 10 hrs. | 0.5% | 33% | 20% | 27189 | 1 | Proc 41 | Dec. 19, 2019 | Hung |
| 5 hrs. 43 sec. | 75% | 21% | 10% | 84792 | 0 | Proc 72 | Jan. 23, 2020 | Hung |
| 6 hrs. 10 min. | 25% | 7% | 0% | NA | 7 | Proc 25 | Feb. 17, 2020 | Running | and other suitable services provided by the cloud service provider. At 525 the system 100 sets the server cluster status to terminated and at 527 terminates the status by value. The system 100 sends at 529 an email, phone call, phone text, or other suitable indication to users associated with the terminated server cluster and at 531 the system 100 enters an entry into AuditLog indicating that the server cluster has been terminated.

In some embodiments, when the system 100 receives a request at 533 to update a workflow status associated with the server cluster, the flow continues at FIG. 5B following the flowchart connectors 1A and 1B. At 535, the system 100 determines whether the workflow status associated with the server cluster is "CREATE COMPLETE", when the server cluster status is "CREATE COMPLETE", the system 100 sets at 537 the cluster status to "READY." Thereafter, the system 100 updates at 539 the cluster status and terminates the previous status by value. In some instances when the server cluster is of a specific type, for example, Elastic MapReduce (EMR) when using Amazon Web Services® (or other suitable type depending on the cloud service provider), the system 100 can send at 543 an email, phone call, phone text notification or other suitable notification informing users associated with the server cluster about the server cluster update. Thereafter the flow continues at 531 (FIG. 5A) where the system 100 enters an entry into AuditLog indicating that the workflow associated with the server cluster has been updated.

In some embodiments, when the system 100 receives at 545 a request to update a workflow status associated with the server cluster corresponding to "DELETE IN PROGRESS," the system 100 determines at 547 if the workflow status is equal to "TERMINATED", when the status is not equal to "TERMINATED", the system 100 sets at 549 the workflow status to "TERMINATED." The system 100 then updates at 551 the workflow associated with the server cluster status and then enters at 531 an entry to AuditLog indicating that the workflow status has been updated.

In some embodiments, when the system 100 receives at 553 a request to update a workflow status associated with the server cluster corresponding to an "AGENT INITIATION," the system 100 determines a cluster type at 555, and thereafter the system 100 can send at 557 an email, phone call, phone text, or other suitable notification to users associated with the server cluster indicating the workflow status associated with the server cluster has been changed.

In some embodiments, when the system 100 receives at 559 a request to update a workflow status associated with the server cluster that has a status of "ARCHIVE FAILED," the system 100 can send a notification to the system administrators or support staff informing them about the failure.

In some embodiments, when a workflow status associated with a server cluster is "ARCHIVE COMPLETE" as shown at 563, the system 100 determines at 565 if the server cluster is associated with a service catalog product, when the server cluster is associated with a service catalog product, the server initiates at 567 a service catalog product termination. In some instances, when the server cluster is not associated with a service catalog product, the system 100 initiates at 569 a stack termination. Thereafter, the system 100 enters at 531 an entry to AuditLog indicating that the workflow has been updated.

Figure 6:
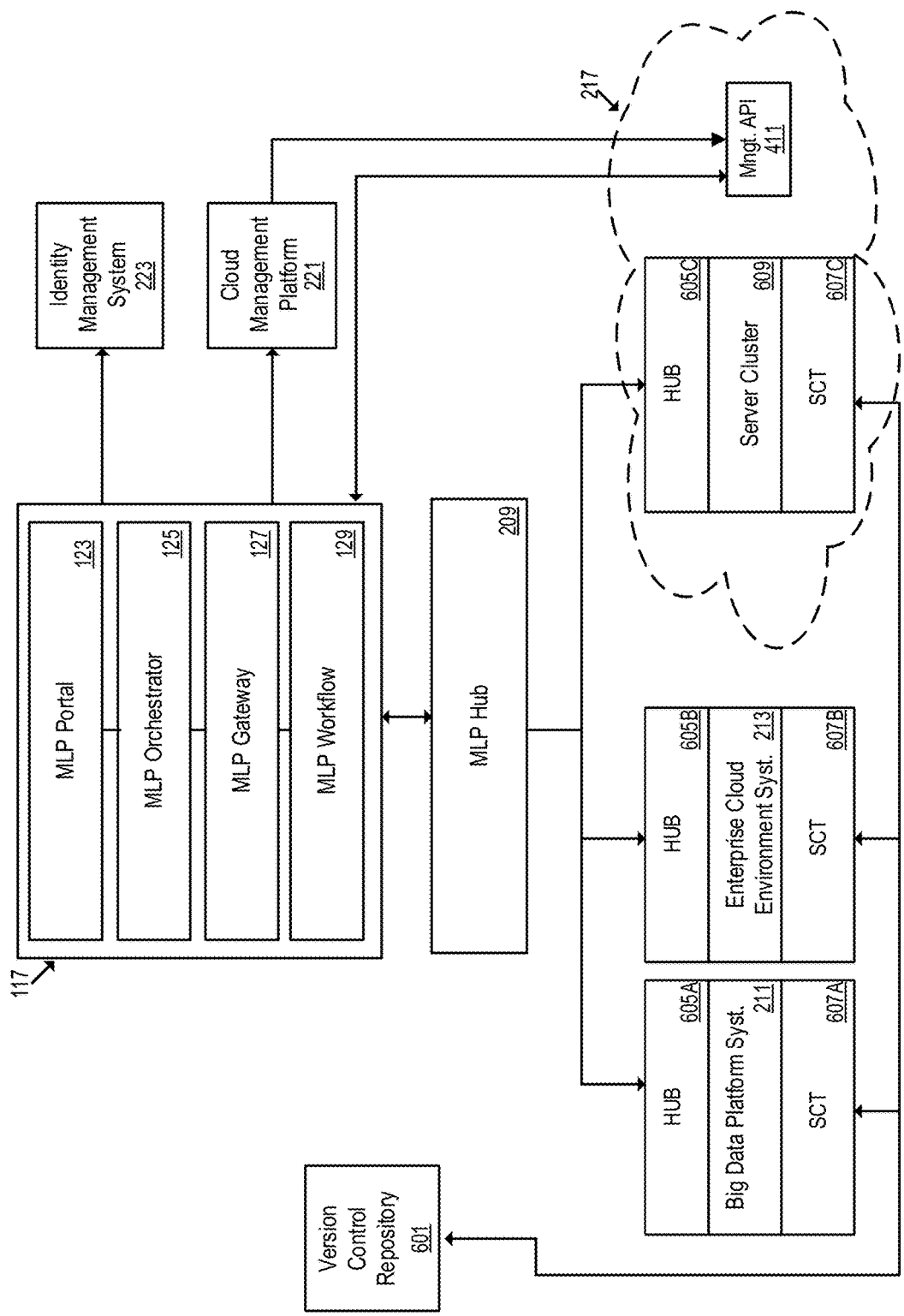

FIG. 6 illustrates an example of a launched computing environment configuration that enables the use of software collaboration tools in a hybrid computer network, in accordance with one or more embodiments of the present disclosure. In some implementations, once the server cluster is ready to be used, the system 100 can redirect the user to an online integrated development environment. In some instances, the online integrated development environment can be customized to include software collaboration tools (607A, 607B, and 607C) with custom tools and custom interfaces. In some instances, when a server cluster is launched, the MLP Hub 209 can make a call via an API to the online integrated development environment such that, the system 100 can authenticate a user using the identifying management system 223.

In some embodiments, the identifying management system 223 can generate a token and create an online integrated development environment instance for the user. The MLP Portal 123 can poll the status of a launched instance of the online integrated development environment. In some instances, the system 100 redirects the user to the online integrated development environment home page. In some instances, the online integrated development environment can include a web based command line terminal interface, a GUI, or other suitable interface to interact with the launched server clusters and run software collaboration tools.

As discussed above, in some embodiments, the cloud management platform 221 can be used by the MLP Orchestrator 125 to interact or manage the off-premise computer network 217. The cloud management platform 221 can interact with the management API 411 via a set of application programming interfaces to request computer resources to the off-premise computer network 217, for example, a request to reserve server clusters residing in the off-premise computer network 217. The management API 411 can send messages to the MLP workflow 129 indicating events occurring in the off-premise computer network 217, for example, initiation, termination, and other events associated with server cluster 609.

In some embodiments, the big data platform system 211, the enterprise cloud environment system 213 and the server cluster 609 can include a hub (605A, 605B, and 605C) respectively. The hubs 605A, 605B, and 605C are part of a multi-tenant system coupled to the MLP Hub 209. The hubs can be implemented as software processes that can received commands from the system 100 via the MLP Hub 209 to, for example, instantiate a server cluster, terminate a server cluster, initialize a server cluster and other suitable commands. Likewise, the big data platform system 211, the enterprise cloud environment system 213 and the server cluster 609 can include a software collaboration tool (607A, 607B, and 607C) respectively.

The software collaboration tools 607A, 607B, and 607C can be in communication with the version control repository 601. The version control repository 601 can be used by developers to review or merge code while controlling read and write access to the code. The integration of the version control repository with the software collaboration tools 607A, 607B, and 607C enables users to share data, code, instantiated processes irrespectively if such data, code, or instantiated processes reside in the big data platform system 211, the enterprise cloud environment system 607B, or the server cluster 609 that is irrespectively of their location in the hybrid computer network.

Figure 7:
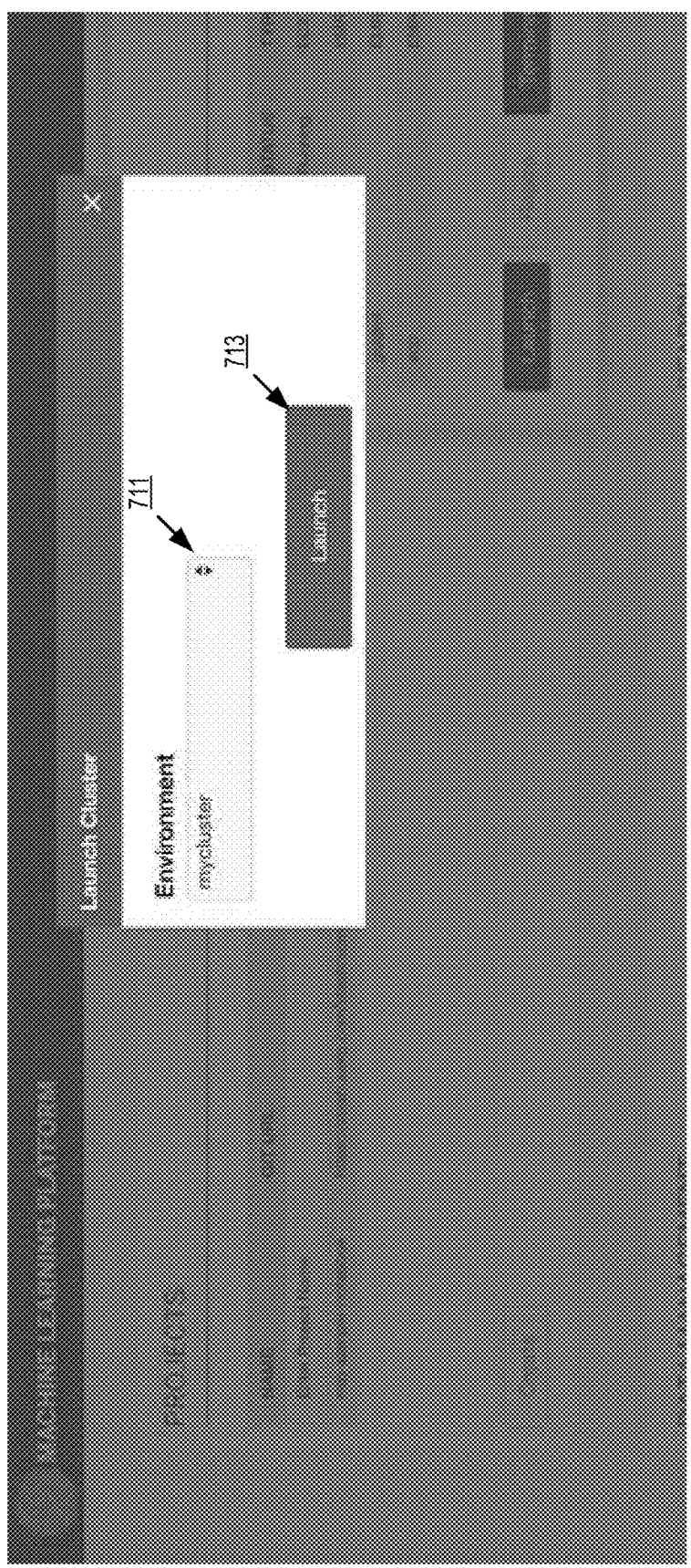

FIG. 7 illustrates an example of a graphical user interface to launch a software collaboration tool, in accordance with one or more embodiments of the present disclosure. In some instances, users can launch software collaboration tools from the MLP Portal 123 by entering a server cluster name 711 and clicking the launch button 713.

Figure 8:
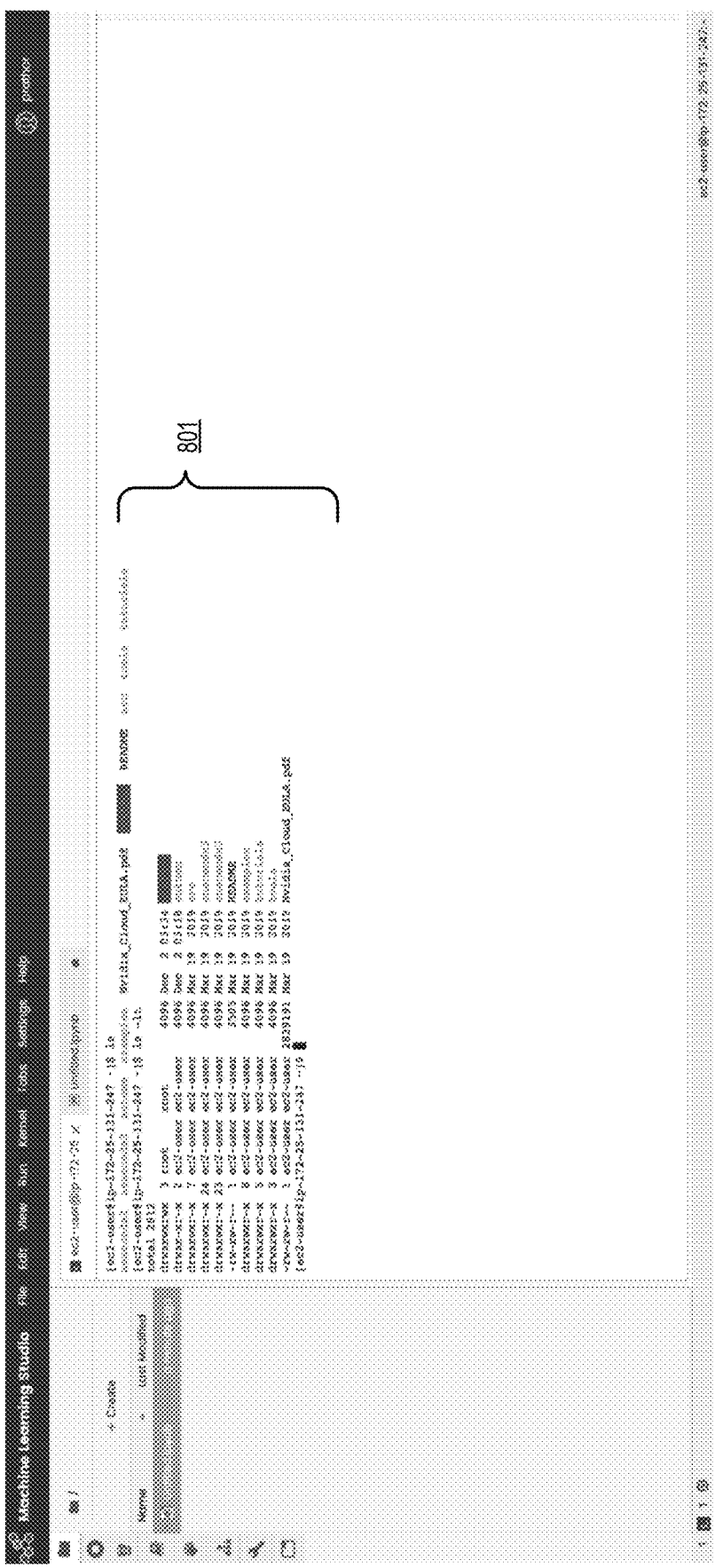

FIG. 8 illustrates an example of an online integrated development environment that can be accessed via the MLP Portal 123, in this instance the interface corresponds to Azure Machine Learning Studio® interface where users can enter commands 801 for the development and execution of big data processes and machine learning processes. It is noted that other online integrated development environments can be equally integrated.

Figure 9:
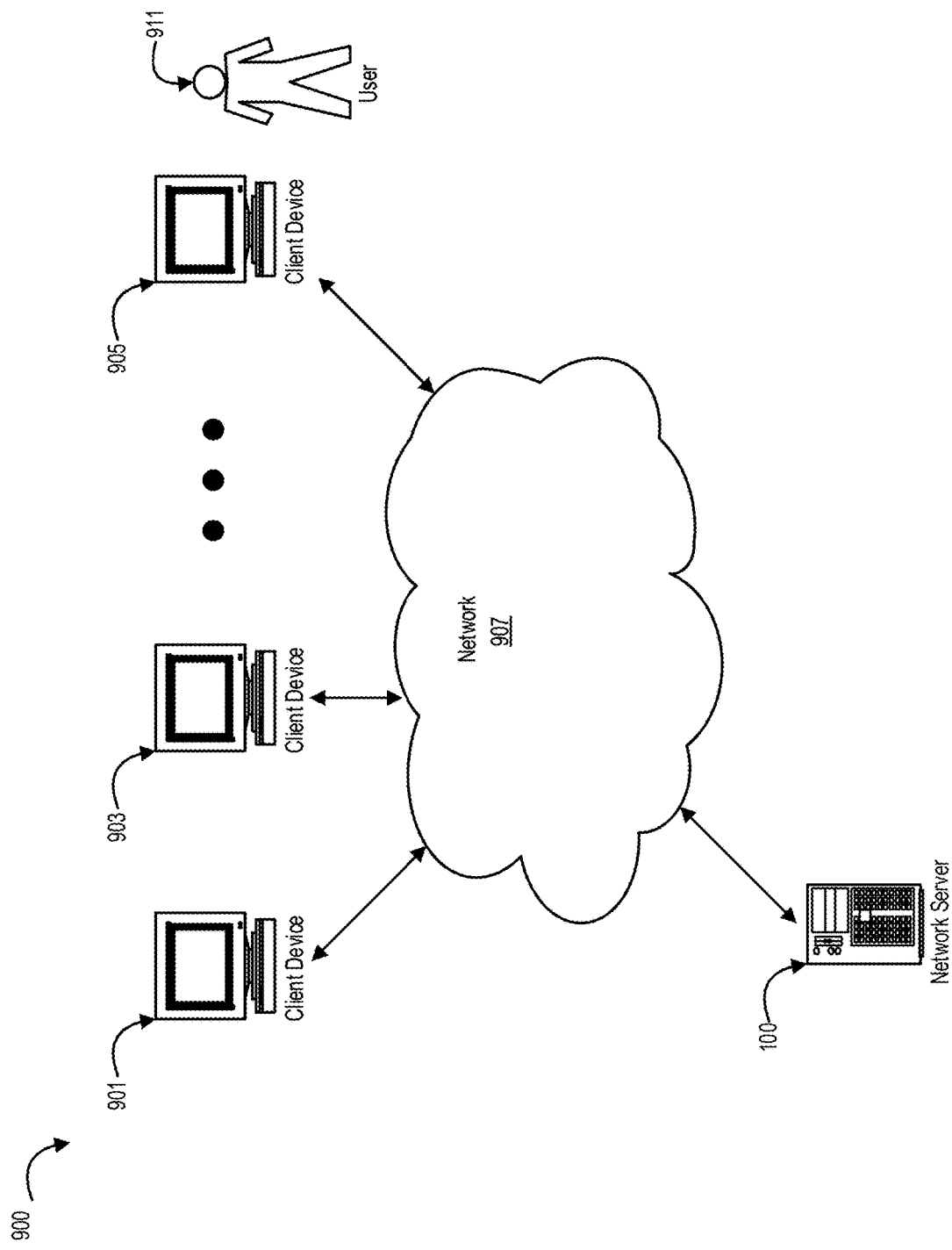

FIG. 9 depicts a block diagram of an example of a computer system 900, in accordance with one or more embodiments of the present disclosure. However, not all these components may be required to practice one or more embodiments, and variations in the arrangement and type of the components may be made without departing from the spirit or scope of various embodiments of the present disclosure.

In some embodiments, the computing devices and/or the computing components of the computer system 900 may be configured to manage large numbers of computing devices and track electronic activities, as detailed herein. In some embodiments, the computer system 900 may be based on a scalable computer and/or network architecture that incorporates various strategies for assessing data, caching, searching, and/or database connection pooling. An example of the scalable architecture is an architecture that is capable of operating multiple servers.

In some embodiments, computing devices 901, 903, and 905 (e.g., clients) of the computer-based system 900 may include virtually any computing device capable of receiving and sending a message over a network (e.g., cloud network), such as network 907, to and from another computing device, such as network server 100, and the like. In some embodiments the system for management of big data development platforms 100 (discussed with reference to FIG. 1) can be implemented in the network server 100. In some instances, a user 911 in communication with client device 905 can enter inputs and receive outputs from the network server 100 via computer network 907. In some embodiments, the computing devices 901, 903, and 905 may be personal computers, multiprocessor systems, microprocessor-based or programmable consumer electronics, network PCs, and the like.

In some embodiments, one or more computing devices 901, 903, and 905 may be devices that can connect using a wired or wireless communication medium, such as a laptop, tablet, desktop computer, and/or any other device that is equipped to communicate over a wired and/or wireless communication medium. In some embodiments, computing devices 901, 903, and 905 may run one or more applications, such as Internet browsers, mobile applications, voice calls, and email, among others.

In some embodiments, computing devices 901, 903, and 905 may be configured to receive and to send web pages, and the like. In some embodiments, a browser application of the present disclosure may be configured to receive and display graphics, text, multimedia, and the like, employing virtually any web based language including, but not limited to, Standard Generalized Markup Language (SGML), such as HyperText Markup Language (HTML), a wireless application protocol (WAP), a Handheld Device Markup Language (HDML), such as Wireless Markup Language (WML), WMLScript, XML, JavaScript, and the like.

In some embodiments, computing devices 901, 903, and 905 may be specifically programmed by either Java, .Net, QT, C, C++ and/or other suitable programming language. In some embodiments, computing devices 901, 903, and 905 may be specifically programmed to include or execute an application to perform a variety of possible tasks, such as, without limitation, messaging functionality, browsing, searching, streaming or displaying various forms of content, including locally stored or uploaded messages, images and/or video.

In some embodiments, the network 907 may provide network access, data transport and/or other services to any computing device coupled to it. In some embodiments, the network 907 may include and implement at least one specialized network architecture that may be based at least in part on one or more standards set by, for example, without limitation, Global System for Mobile Communications (GSM) Association, the Internet Engineering Task Force (IETF), and the Worldwide Interoperability for Microwave Access (WiMAX) forum.

In some embodiments, the network 907 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 907 may include and implement, as an alternative or in conjunction with one or more of the above, a WiMAX architecture defined by the WiMAX forum.

In some embodiments and, optionally, in combination with any embodiment described above or below, the network 907 may also include, for instance, at least one of a local area network (LAN), a wide area network (WAN), the Internet, a virtual LAN (VLAN), an enterprise LAN, a layer 3 virtual private network (VPN), an enterprise IP network (on-premise computer network), an off-premise computer network or any combination thereof. In some embodiments and, optionally, in combination with any embodiment described above or below, at least one computer network communication over the network 907 may be transmitted based at least, in part, on one or more communication modes such as, but not limited to: Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof.

In some embodiments, the network 907 may also include mass storage, such as Network Attached Storage (NAS), a Storage Area Network (SAN), a Content Delivery Network (CDN) or other forms of computer or machine-readable media.

In some embodiments, the server 100 may be, for example, a web server (or a series of servers or server cluster) running a network operating system. In some embodiments, the server 100 may be used for and/or provide cloud and/or network computing. Although not shown in FIG. 9, in some embodiments, the server 100 may have connections to external systems like email, SMS messaging, cloud service provider, and other suitable external systems.

In some embodiments and, optionally, in combination of any embodiment described above or below, for example, one or more computing devices 901, 903, and 905, the server 100, may include a specifically programmed software module that may be configured to send, process, and receive information using a scripting language, a remote procedure call, an email, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may.

Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

In some embodiments, computer-based systems of the present disclosure may be configured to utilize hardwired circuitry and/or hardware components that may be used in place of or in combination with software instructions to implement latent features extraction consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive.

At least some aspects of the present disclosure will now be described with reference to the following numbered clauses.

Clause 1: An apparatus, comprising: a processor; and a non-transitory memory storing instructions which, when executed by the processor, cause the processor to: receive, from an online portal loaded in a computing device, a user request to instantiate a server cluster in a hybrid computer network; authenticate a user associated with the user request utilizing an identity management registry; redirect the user request via a proxy service to a selected computer network comprised in the hybrid computer network based on the authentication; instantiate the server cluster in the selected computer network, wherein the server cluster is configured to initiate at least one microservice agent during a bootup of the server cluster; send an initiation command, via the proxy service, to the server cluster to initiate the execution of a big data process in the server cluster; receive, from the at least one microservice agent, a plurality of event data items associated with the big data process; input the plurality of event data items into a trained machine learning model to determine a first execution state of the big data process; send a modification command, via the proxy service, to change the first execution state of the big data process to a second execution state of the big data process; and receive, from the at least one microservice agent, an update message, indicative of whether the big data process was successfully changed to the second execution state. At least some aspects of the present disclosure will now be described with reference to the following numbered clauses.

Clause 2: The apparatus of clause 1, wherein the first execution state indicates that the big data process is in a hung state and the instructions further cause the processor to: send a termination command to the server cluster that causes the server cluster to backup data associated with the big data process and terminate the big data process.

Clause 3: The apparatus of clauses 1-2, wherein the first execution state indicates that the big data process has been running for a first predetermined time threshold and the instructions further cause the processor to: send a message to a user computing device associated with the user that indicates that the big data process has been running for the first predetermined time threshold; and send a termination command to the server cluster that causes the server cluster to backup data associated with the big data process and terminate the big data process based on a confirmation message received from the computing device or when no confirmation message is received from the computing device before a second predetermined time threshold.

Clause 4: The apparatus of clauses 1-3, wherein the plurality of event data items comprises process running duration, central processing unit utility rate, memory utility rate, disk utility rate, parent process identifier, number of child processes associated with the process, the process name, or the process creation time.

Clause 5: The apparatus of clauses 1-4, wherein the selected computer network is an on-premise computer network, the server cluster is an on-premise server cluster, and the on-premise server cluster is in communication with an off-premise server cluster via a software collaboration tool.

Clause 6: The apparatus of clauses 1-5, wherein the selected computer network is an off-premise computer network, the server cluster is an off-premise server cluster, and the off-premise server cluster is in communication with an on-premise server cluster via a software collaboration tool.

Clause 7: The apparatus of clauses 1-6, wherein upon the instantiation of the server cluster the instructions further cause the processor to: redirect the user to an online integrated development environment operatively coupled to the server cluster.

Clause 8: A method comprising: receiving, by a server computer, from an online portal loaded in a computing device, a user request to instantiate a server cluster in a hybrid computer network; authenticating, by the server computer, a user associated with the user request utilizing an identity management registry; redirecting, by the server computer via a proxy service, the user request to a selected computer network comprised in the hybrid computer network based on the authentication; instantiating, by the server computer, the server cluster in the selected computer network, wherein the server cluster is configured to initiate at least one microservice agent during a bootup of the server cluster; sending, by the server computer via the proxy service, an initiation command to the server cluster to initiate the execution of a big data process in the server cluster; receiving, by the server computer, from the at least one microservice agent, a plurality of event data items associated with the big data process; inputting, by the server computer, the plurality of event data items into a trained machine learning model to determine a first execution state of the big data process; sending, by the server computer via the proxy service, a modification command via the proxy service, to change the first execution state of the big data process to a second execution state of the big data process; and receiving, by the server computer from the at least one microservice agent, an update message indicative of whether the big data process was successfully changed to the second execution state.

Clause 9: The method of clause 8, wherein the first execution state indicates that the big data process is in a hung state and further comprising: sending, by the server computer, a termination command to the server cluster that causes the server cluster to backup data associated with the big data process and terminate the big data process.

Clause 10: The method of clauses 8-9, wherein the first execution state indicates that the process has been running for a first predetermined time threshold and further comprising: sending, by the server computer, a message to a user computing device associated with the user that indicates that the big data process has been running for the first predetermined time threshold; and sending, by the server computer, a termination command to the server cluster that causes the server cluster to backup data associated with the big data process and terminate the big data process based on a confirmation message received from the computing device or when no confirmation message is received from the computing device before a second predetermined time threshold.

Clause 11: The method of clauses 8-10, wherein the plurality of event data items comprises process running duration, central processing unit utility rate, memory utility rate, disk utility rate, parent process identifier, number of child processes associated with the process, the process name, or the process creation time.

Clause 12: The method of clauses 8-11, wherein the selected computer network is an on-premise computer network, the server cluster is an on-premise server cluster, and the on-premise server cluster is in communication with an off-premise server cluster via a software collaboration tool.

Clause 13: The method of clauses 8-12, wherein the selected computer network is an off-premise computer network, the server cluster is an off-premise server cluster, and the off-premise server cluster is in communication with an on-premise server cluster via a software collaboration tool.

Clause 14: The method of clauses 8-13, further comprising: redirecting, by the server computer, the user to an online integrated development environment operatively coupled to the server cluster upon the instantiation of the server cluster.

Clause 15: A non-transitory computer readable medium comprising instructions which, when executed by a processor, cause the processor to: receive, from an online portal loaded in a computing device, a user request to instantiate a server cluster in a hybrid computer network; authenticate a user associated with the user request utilizing an identity management registry; redirect the user request via a proxy service to a selected computer network comprised in the hybrid computer network based on the authentication; instantiate the server cluster in the selected computer network, wherein the server cluster is configured to initiate at least one microservice agent during a bootup of the server cluster; send an initiation command, via the proxy service, to the server cluster to initiate the execution of a big data process in the server cluster; receive, from the at least one microservice agent, a plurality of event data items associated with the big data process; input the plurality of event data items into a trained machine learning model to determine a first execution state of the big data process; send a modification command, via the proxy service, to change the first execution state of the big data process to a second execution state of the big data process; and receive, from the at least one microservice agent, an update message, indicative of whether the big data process was successfully changed to the second execution state.

Clause 16: The non-transitory computer readable of clause 15, wherein the first execution state indicates that the big data process is in a hung state and the instructions further cause the processor to: send a command to the server cluster to backup data associated with the big data process and terminate the big data process.

Clause 17: The non-transitory computer readable of clause 15-16, wherein the first execution state indicates that the big data process has been running for a first predetermined time threshold and the instructions further cause the processor to: send a message to a user computing device associated with the user that indicates that the big data process has been running for the first predetermined time threshold; and send a command to the server cluster to backup data associated with the big data process and terminate the big data process based on a confirmation message received from the computing device or when no confirmation message is received from the computing device before a second predetermined time threshold.

Clause 18: The non-transitory computer readable of clauses 15-17, wherein the plurality of event data comprises process running duration, central processing unit utility rate, memory utility rate, disk utility rate, parent process identifier, number of child processes associated with the process, the process name, or the process creation time.

Clause 19: The non-transitory computer readable of clauses 15-18, wherein the selected computer network is an on-premise computer network, the server cluster is an on-premise server cluster, and the on-premise server cluster is in communication with an off-premise server cluster via a software collaboration tool.

Clause 20: The non-transitory computer readable of clauses 15-19, wherein the selected computer network is an off-premise computer network, the server cluster is an off-premise server cluster, and the off-premise server cluster is in communication with an on-premise server cluster via a software collaboration tool.

While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

Therefore, the following is claimed:

1. A system, comprising:
   at least one computing device comprising a processor and a memory; and
   machine-readable instructions stored in the memory that, when executed by the processor, cause the computing device to at least:
      instantiate a server cluster;
      send an initiation command to the server cluster to initiate execution of a process in the server cluster;
      receive, from the server cluster, a plurality of event data items associated with the process;
      input the plurality of event data items into a trained machine learning model to determine a first execution state of the process; and
      send a modification command to the server cluster to change the first execution state of the process to a second execution state of the process.

2. The system of claim 1, wherein the first execution state indicates that the process is in a hung state and the second execution state is a terminated state, and the machine-readable instructions, when executed by the processor, further cause the computing device to at least send a back-up command to the server cluster prior to sending the modification command, wherein the back-up command causes the server cluster to backup data associated with the process.

3. The system of claim 1, wherein the machine-readable instructions, when executed by the processor, further cause the at least one computing device to at least receive an update message that is indicative of whether the process was successfully changed from the first execution state to the second execution state.

4. The system of claim 1, wherein the plurality of event data items comprises at least one of a process running duration, a central processing (CPU) utilization rate, a memory utilization rate, a disk utilization rate, a parent process identifier, a number of child processes associated with the process, a name of the process, or a creation time of the process.

5. The apparatus of claim 1, wherein the machine-readable instructions, when executed by the processor, further cause the at least one computing device to at least:
   receive a user request to instantiate the server cluster;
   authenticate a user associated with the user request; and
   instantiate the server cluster in response to authentication of the user.

6. The system of claim 5, wherein the user request is received from an online portal.

7. The system of claim 5, wherein the machine-readable instructions, when executed by the processor, further cause the at least one computing device to at least redirect the user to an online integrated development environment (IDE) in response to instantiation of the server cluster.

8. A method, comprising:
   instantiating a server cluster;
   sending an initiation command to the server cluster to initiate execution of a process in the server cluster;
   receiving, from the server cluster, a plurality of event data items associated with the process;
   inputting the plurality of event data items into a trained machine learning model to determine a first execution state of the process; and
   sending a modification command to the server cluster to change the first execution state of the process to a second execution state of the process.

9. The method of claim 8, wherein the first execution state indicates that the process is in a hung state and the second execution state is a terminated state, and the method further comprises sending a back-up command to the server cluster prior to sending the modification command, wherein the back-up command causes the server cluster to backup data associated with the process.

10. The method of claim 8, further comprising receiving an update message that is indicative of whether the process was successfully changed from the first execution state to the second execution state.

11. The method of claim 8, wherein the plurality of event data items comprises at least one of a process running duration, a central processing (CPU) utilization rate, a memory utilization rate, a disk utilization rate, a parent process identifier, a number of child processes associated with the process, a name of the process, or a creation time of the process.

12. The method of claim 8, further comprising:
   receiving a user request to instantiate the server cluster;
   authenticating a user associated with the user request; and
   instantiating the server cluster in response to authenticating the user.

13. The method of claim 12, wherein the user request is received from an online portal.

14. The method of claim 12, further comprising redirecting the user to an online integrated development environment (IDE) in response to instantiating the server cluster.

15. A non-transitory computer readable medium comprising instructions which, when executed by a processor of a computing device, cause the computing device to at least:
   instantiate a server cluster;
   send an initiation command to the server cluster to initiate execution of a process in the server cluster;
   receive, from the server cluster, a plurality of event data items associated with the process;

input the plurality of event data items into a trained machine learning model to determine a first execution state of the process; and send a modification command to the server cluster to change the first execution state of the process to a second execution state of the process.

16. The non-transitory computer readable of claim 15, wherein the first execution state indicates that the process is in a hung state and the second execution state is a terminated state, and the machine-readable instructions, when executed by the processor, further cause the computing device to at least send a back-up command to the server cluster prior to sending the modification command, wherein the back-up command causes the server cluster to backup data associated with the process.

17. The non-transitory computer readable of claim 15, wherein the machine-readable instructions, when executed by the processor, further cause the at least one computing device to at least receive an update message that is indicative of whether the process was successfully changed from the first execution state to the second execution state.

18. The non-transitory computer readable of claim 15, wherein the plurality of event data items comprises at least one of a process running duration, a central processing (CPU) utilization rate, a memory utilization rate, a disk utilization rate, a parent process identifier, a number of child processes associated with the process, a name of the process, or a creation time of the process.

19. The non-transitory computer readable of claim 15, wherein the machine-readable instructions, when executed by the processor, further cause the at least one computing device to at least:

receive a user request to instantiate the server cluster;
authenticate a user associated with the user request; and
instantiate the server cluster in response to authentication of the user.

20. The non-transitory computer readable of claim 15, wherein the machine-readable instructions, when executed by the processor, further cause the at least one computing device to at least redirect the user to an online integrated development environment (IDE) in response to instantiation of the server cluster.

\* \* \* \* \*